United States Patent
Cantin et al.

(10) Patent No.: US 7,433,058 B2
(45) Date of Patent: Oct. 7, 2008

(54) SYSTEM AND METHOD FOR SIMULTANEOUS 3D HEIGHT MEASUREMENTS ON MULTIPLE SIDES OF AN OBJECT

(75) Inventors: Michel Cantin, Brossard (CA); Benoit Quirion, Boucherville (CA)

(73) Assignee: SolVision Inc., Boucherville, QC (CA)

( * ) Notice: Subject to any disclaimer, the term of this patent is extended or adjusted under 35 U.S.C. 154(b) by 220 days.

(21) Appl. No.: 10/888,507

(22) Filed: Jul. 12, 2004

(65) Prior Publication Data
US 2006/0007450 A1    Jan. 12, 2006

(51) Int. Cl.
*G01B 11/24* (2006.01)
(52) U.S. Cl. ................................ 356/605; 356/512
(58) Field of Classification Search ............... 356/605, 356/511–514, 618
See application file for complete search history.

(56) References Cited

U.S. PATENT DOCUMENTS

| | | | |
|---|---|---|---|
| 3,814,521 A | | 6/1974 | Free |
| 4,349,277 A | * | 9/1982 | Mundy et al. ............. 356/604 |
| 5,383,025 A | * | 1/1995 | Forrest ...................... 356/605 |
| 5,793,488 A | * | 8/1998 | Kulawiec et al. ........... 356/512 |
| 7,023,559 B1 | * | 4/2006 | Coulombe et al. ......... 356/511 |
| 2001/0043333 A1 | * | 11/2001 | Groot et al. ................ 356/511 |
| 2002/0018118 A1 | * | 2/2002 | Coulombe et al. ......... 348/43 |
| 2003/0016366 A1 | * | 1/2003 | Takeda et al. .............. 356/604 |

FOREIGN PATENT DOCUMENTS

WO    WO2004/046645    9/2004

\* cited by examiner

*Primary Examiner*—Samuel A. Turner
(74) *Attorney, Agent, or Firm*—Bereskin and Parr

(57) ABSTRACT

An interferometric method for determining a height profile of regions of the surface area of an object or of several objects, wherein the regions are substantially in different planes, is presented. The optical path of at least one portion of intensity coming from one of the regions is modified while obtaining at least one image, wherein each image contains the portion of intensity and corresponds to an intensity pattern projected on the regions. An object phase associated with the regions is established using the obtained image(s) and a height profile of the regions is determined using the object phase and a reference phase. An optical assembly is used for directing along a common detection axis an intensity coming from said regions that would be otherwise out of sight.

55 Claims, 10 Drawing Sheets

SYSTEM AND METHOD FOR SIMULTANEOUS 3D HEIGHT MEASUREMENTS ON MULTIPLE SIDES OF AN OBJECT

FIELD OF THE INVENTION

The invention relates to measurement systems and methods. More specially, the present invention relates to 3D height measurement, based on a Fast Moiré Interferometry, on multiple sides of an object.

BACKGROUND OF THE ART

In the field of semi-conductor fabrication, the inspection of the quality of the semi-conductor surface, as the different components and circuit layers are added, is very important. Inspections can consist in verifying that all the features of the circuit have their expected shapes and volumes. In this case, a technique, such as the Fast Moiré Interferometry (FMI), which can provide a 3D map of a surface of the object, can be used to verify the shape and volume of the circuit features. Such method offers the possibility to obtain height mapping of only one side of the semi-conductor, generally the top face on which the circuit components are laid.

OBJECTS OF THE INVENTION

There is a need to inspect not only the top face of the semi-conductor but also its side faces. For example, this is the case of Quad Flat No-Lead (QFN) components, for which both top and four side faces need to be inspected in order to verify at the same time the quality of the circuit and the mechanical integrity of the chip (by verifying that there are no surface defaults on the sides). Therefore, it would be useful if a method such as the FMI method could provide a height mapping of multiple sides of an object.

SUMMARY

The invention provides an interferometric method for determining a height profile of regions of the surface area of an object or of several objects, wherein the regions are substantially in different planes. The method comprises obtaining at least one image of the regions, by modifying an optical path of at least one portion of intensity coming from one of the regions, wherein each image comprises the portion of intensity and corresponds to an intensity pattern projected on the regions. An object phase associated to the regions is established using the obtained image(s) and a height profile of the regions is determined using the object phase and a reference phase.

The invention further comprises modifying the optical path by directing along a common detection axis an intensity coming from the object, wherein the intensity is being formed with the portions of intensity coming from the corresponding regions.

The invention further comprises obtaining an image by obtaining simultaneously the portions of intensity coming from the corresponding regions, to thereby simultaneously obtain the image and to provide for a simultaneous height profiling of the regions.

The invention further provides an interferometric method for determining a height profile of a region of a surface area of an object, wherein the region is not substantially in the line of sight of a detection axis. The method comprises obtaining, along the detection axis, an image of the region, by modifying an optical path of an intensity coming from the region, wherein the intensity forms the image and corresponds to an intensity pattern projected on the region. The method also comprises establishing an object phase associated to the region using the image and comprises determining the height profile of the region using the object phase and a reference phase.

The invention also provides an interferometric system for determining a height profile of regions of the surface area of an object, wherein said regions are substantially in different planes. The system comprises a pattern projection assembly for projecting an intensity pattern along a projection axis towards the object and an optical assembly for directing along a detection axis an intensity coming from the regions of the object to provide a directed intensity. Also, the system comprises a detection assembly for obtaining along the detection axis at least one image of the object by detecting the directed intensity coming from the regions and a processor for establishing a phase of the object using the at least one image and for determining the height of the object using the object phase and a reference phase.

The invention also provides a system that comprises an optical assembly for redirecting along a common detection axis an intensity coming from the regions of the object that would be otherwise out of sight.

The invention further provides a system that comprises an optical assembly for bringing simultaneously into focus all the regions of the object, to thereby simultaneously obtain the image and to provide for a simultaneous height profiling of the regions.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, reference to the accompanying drawings is by way of illustration of an example by which the invention may be practiced. It will be understood that other embodiments may be made without departing from the scope of the invention disclosed.

In one embodiment of the present invention, the relief map of the top face and of two side faces of an object having a substantially parallelepiped rectangle volume, is measured using a Fast Moiré Interferometry phase stepping method. This object having a substantially parallelepiped rectangle volume could be for example a QFN microelectronic type component. Naturally, the following description could as well be applied to any kind of object, having any kind of volume type. Therefore, the following disclosure is not restricted to objects having a parallelepiped rectangle volume.

Figure 1:
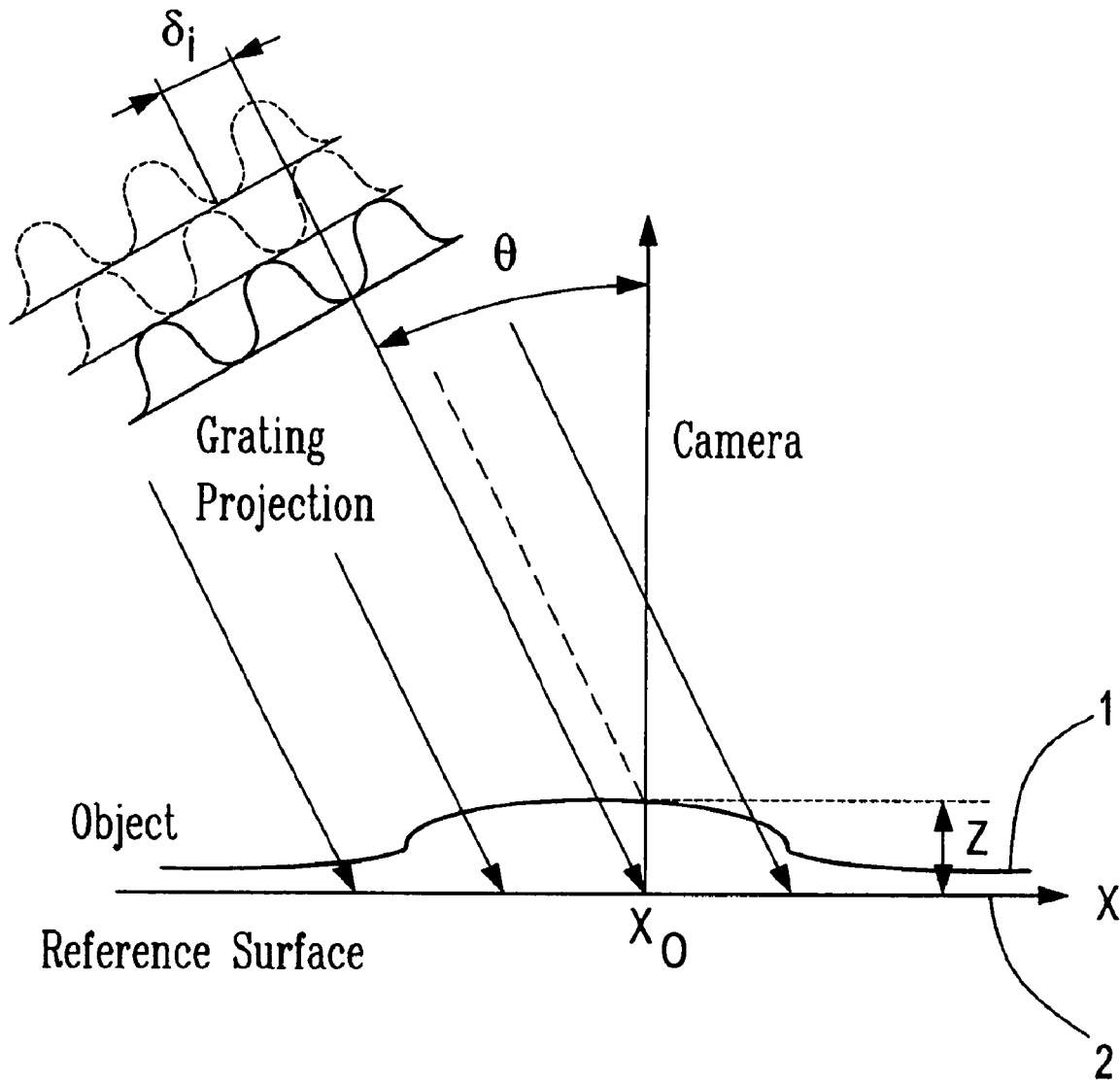
FIG. 1 is a schematic view of a phase-stepping Fast Moiré Interferometry (FMI) method as known in the prior art.

The Fast Moire Interferometry phase-stepping method (FMI) is based on the combination of structured light projection and phase-shift method for the extraction of 3D information at each point of an image, I(x,y). FIG. 1 presents an example of such a FMI method, that can provide a relief map of one side of an object 1.

An image of an object 1 is taken and the 3D information corresponding to the relief map of the object is extracted from this image by evaluating an intensity variation at each point of the image due to the relief of the object. The relief information of the object, $z_{object}(x,y)$, can be found in the phase map $\phi_{object}(x,y)$ associated with the variation of the image intensity, I(x,y). A phase-shifting technique based on taking different images for different grating projections is used to determine, from the images, the phase map $\phi_{object}(x,y)$ for both the object and for a reference surface 2 $\phi_{ref}(x,y)$. As is well known in the art, depending on the situation, the phase map may be determined with only two images (meaning that there are only two intensity pattern projections, each pattern projections being phase-shifted from the other) or with more than two images (in this case, more phase-shifted projections of the intensity pattern are needed).

Once the object and reference phase maps have been determined, the relief of the object relative to the reference surface, $h(x,y)=z_{object}(x,y)-z_{ref}(x,y)$, is calculated on the basis of the difference of the phase values, $\delta(x,y)$, for each point of the image:

$$h(x,y)=z_{object}(x,y)-z_{ref}(x,y) \leftarrow \delta(x,y)=\phi_{object}(x,y)-\phi_{ref}(x,y).$$

Thus, the FMI method offers the possibility to measure a relief of an object relative to any reference surface. For example, it could be a plane reference, or a model object without any defects.

As described in the following, this FMI method may also be applied to provide a relief map of not only one side of the object 1, but of multiple sides of the object 1, even if these sides are in planes that are substantially perpendicular to each other.

Figure 2:
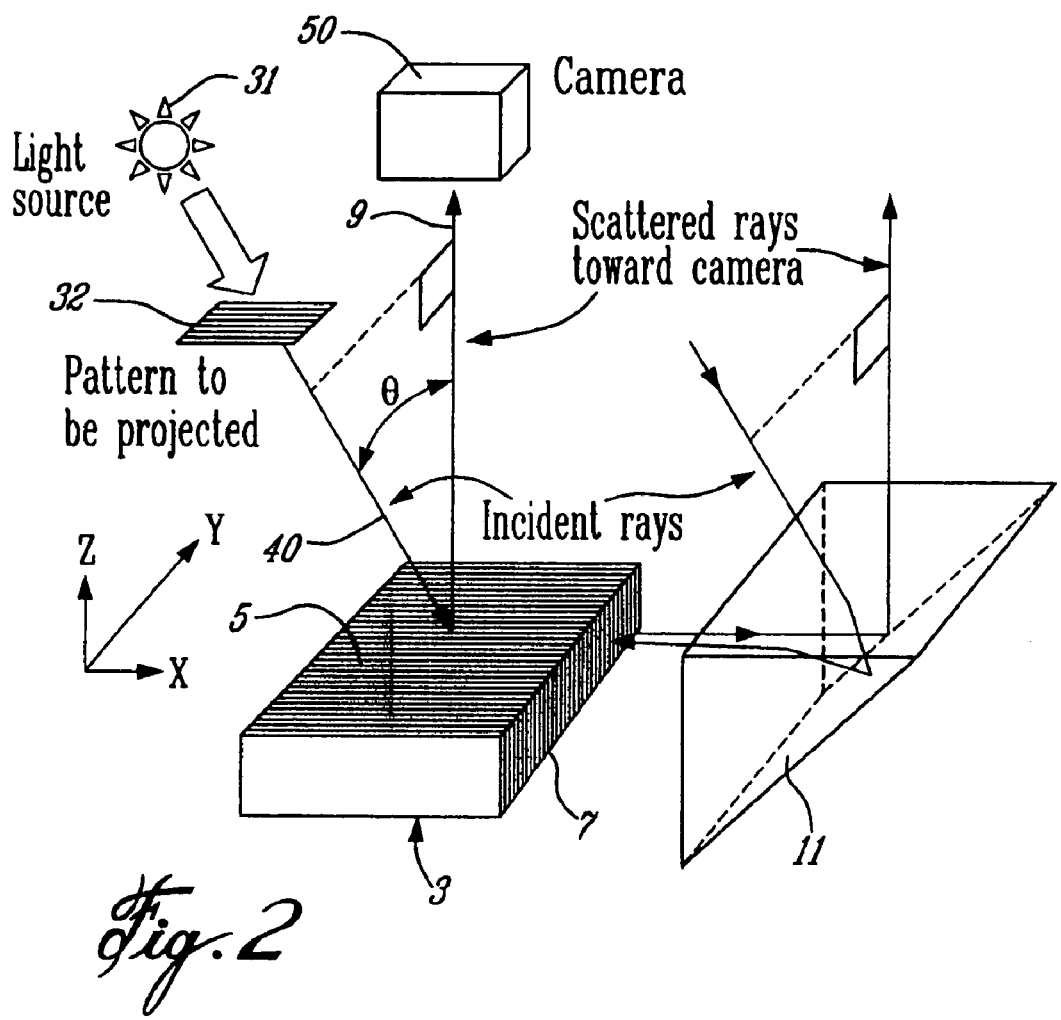
FIG. 2 is a perspective schematic view of an FMI system for measuring a height map of multiple sides of an object in accordance with one embodiment of the present invention, with a prism to modify the optical paths of some illustrated rays.

FIG. 2 presents an example of the FMI system applied to measure the relief map of the top face 5 and of two side faces (only one shown on the figure by the label 7) of an object 3. As illustrated, the three surfaces under inspection lie in planes that are perpendicular to each other.

An intensity pattern 32, such as for example a grating pattern or a sinusoidal pattern, is projected along a projection axis 40 on the object 3. The projection axis 40 makes an angle θ with the normal of the surface of the top face 5 of the object. A camera, part of a detection assembly 50, measures, along a detection axis 9 (which is in this particular example also parallel to the normal of the surface of the top face 5 of the object), an image 13 of the object 3 corresponding to the first projection of the intensity pattern.

Then, the projection of the intensity pattern 32 on the object 3 is phase-shifted and another image is taken. This sequence of measurements is repeated until enough images are acquired. From these images, a phase map of the object $\phi_{object}(x,y)$ is calculated and, as mentioned above, when the phase map is compared to a reference phase map, $\phi_{ref}(x,y)$, a relief map h(x,y) can be determined.

Although an embodiment using we a Fast Moiré Interferometry method based on phase-shifting (or phase-stepping) of an intensity pattern was described, it will be obvious for someone skilled in the art, that other ways, without departing from the scope of the invention, can be used to extract, from an image, the phase map information. The other ways include the use of Fast Fourier Transform techniques to determine the phase map of the object. The present invention comprises all techniques by which the relief map information of an object can be extracted from one or more images, the images being characteristics of the object on which is projected a structured intensity (intensity patterns). Also, it is worthwhile to mention that the projection of phase-shifted intensity patterns include the simultaneous projection of several patterns that are each one projected in different spectral bandwidths.

It can be seen on FIG. 2 that in order to project the pattern on the three faces of the object that are under inspection and to detect with a single camera an intensity coming from the three faces, an optical device is used for each side faces, in this particular case, a prism 11, although other type of optical devices could also be used, to direct the scattered rays coming from the side faces of the object towards the camera and along a common detection axis 9. By doing so, a detection assembly 50 having only one camera can be successfully used to map three sides of the object.

It may also be seen on FIG. 2 that the optical devices, in this case prisms 11, not only direct the scattered rays from the two side faces towards the camera but also direct some portions of the projected intensity pattern (incident rays) towards these side faces. Therefore, in this particular embodiment, only one pattern projection assembly 30 is needed to perform the mapping of several faces of the object.

Figure 3:
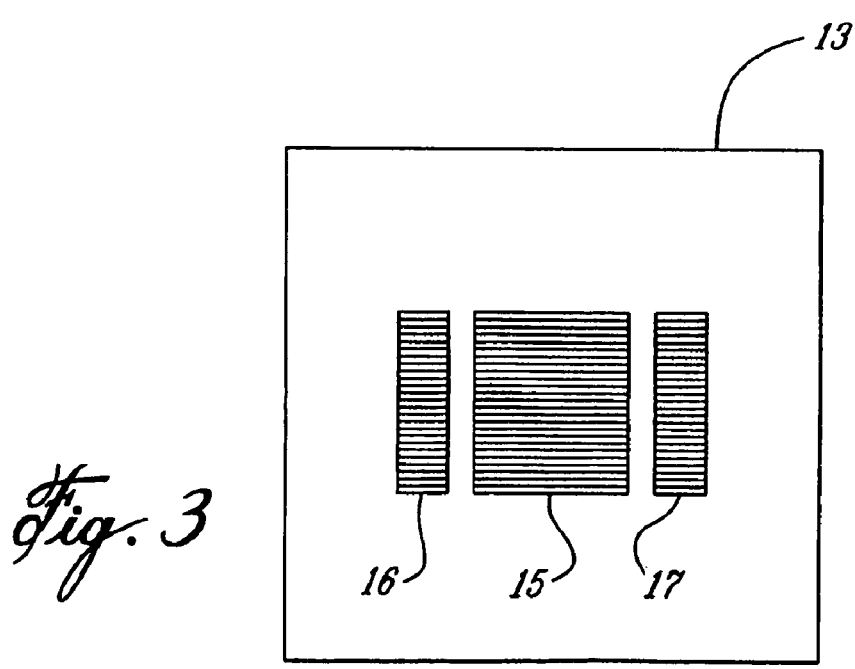
FIG. 3 is a schematic view of an image of the object obtained with the system of FIG. 2, in the case where the top and two side faces of the object are inspected.

FIG. 3 illustrates schematically the resulting image 13 obtained with a system such as the one illustrated in FIG. 2 (where two prisms are used, each one juxtaposed to a corresponding side face). It can be seen that the image is composed of three portions, a central portion corresponding to the top face 5 of the object, and two side portions 16,17 corresponding to the two side faces of the object.

Figure 4:
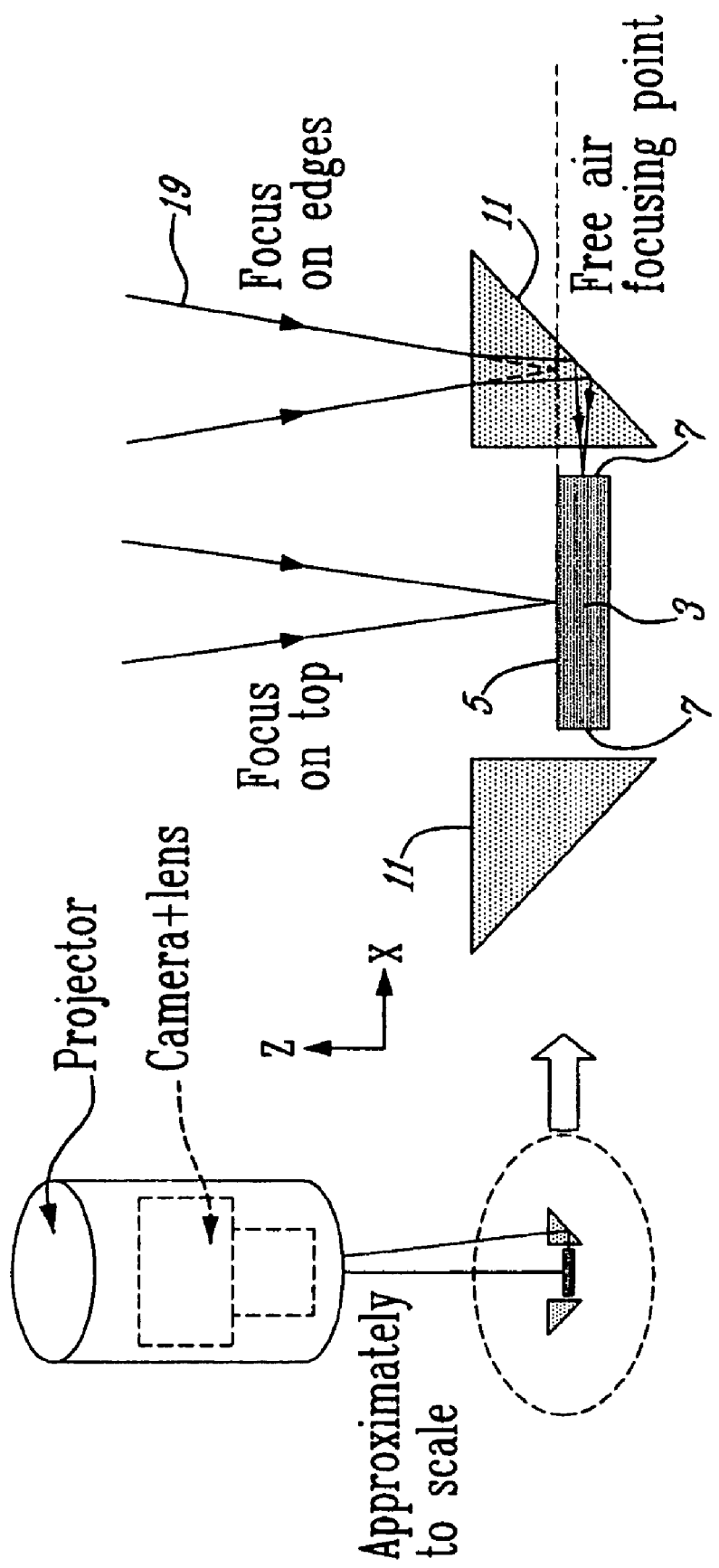
FIG. 4 is a schematic view of the system of FIG. 2 in the plan ZX, showing how the optical path of rays entering the prism are modified by the prism.

FIG. 4 illustrates in more detail how the light rays 19 of the portions of the intensity pattern intended to be projected on the sides of the object are effectively directed towards these side faces using a glass prism 11. As can be seen these light rays 19 are reflected at the air-prism boundary due to internal reflection, and the direction of their optical paths is therefore turned by 90 degrees, directing them towards the sides. Naturally, someone skilled in the art will understand that the same can be said about rays coming from the side faces: the direction of their optical paths will also be changed by the presence of the prism 11, thus enabling detecting them along a common detection axis 9.

The use of prism 11 enables one to not only change the direction of the optical path of the scattered/incident rays, but also enables one to displace the focal point of the projection and/or of the detection assembly of the portion of image corresponding to the rays going to/coming from the side faces. This is due to the refraction phenomena which modifies the optical path of the projected rays entering the prism, thus pushing farther away, towards the side faces, the focusing point of the converging rays (incident rays). The same can be said about rays that are scattered by the side faces and are relayed by the prism toward the detection assembly. This way it is therefore possible to bring into focus all the scattered rays/incident rays from the object at the same focus level, enabling a relief mapping of multiple sides of the object that is obtained simultaneously and with a single projection/detection assembly.

Of course, other optical arrangements could also be used that would give the same result. For example, a combination of mirror and glass plates could work just as well. The invention is thus not limited to the above-described optical arrangement.

Also, as it will be obvious for someone skilled in the art that by juxtaposing four prisms to the four side faces of the object, a relief map of the top and the four side faces (thus of five sides of an object) can be simultaneously obtained with the present invention.

Figure 5:
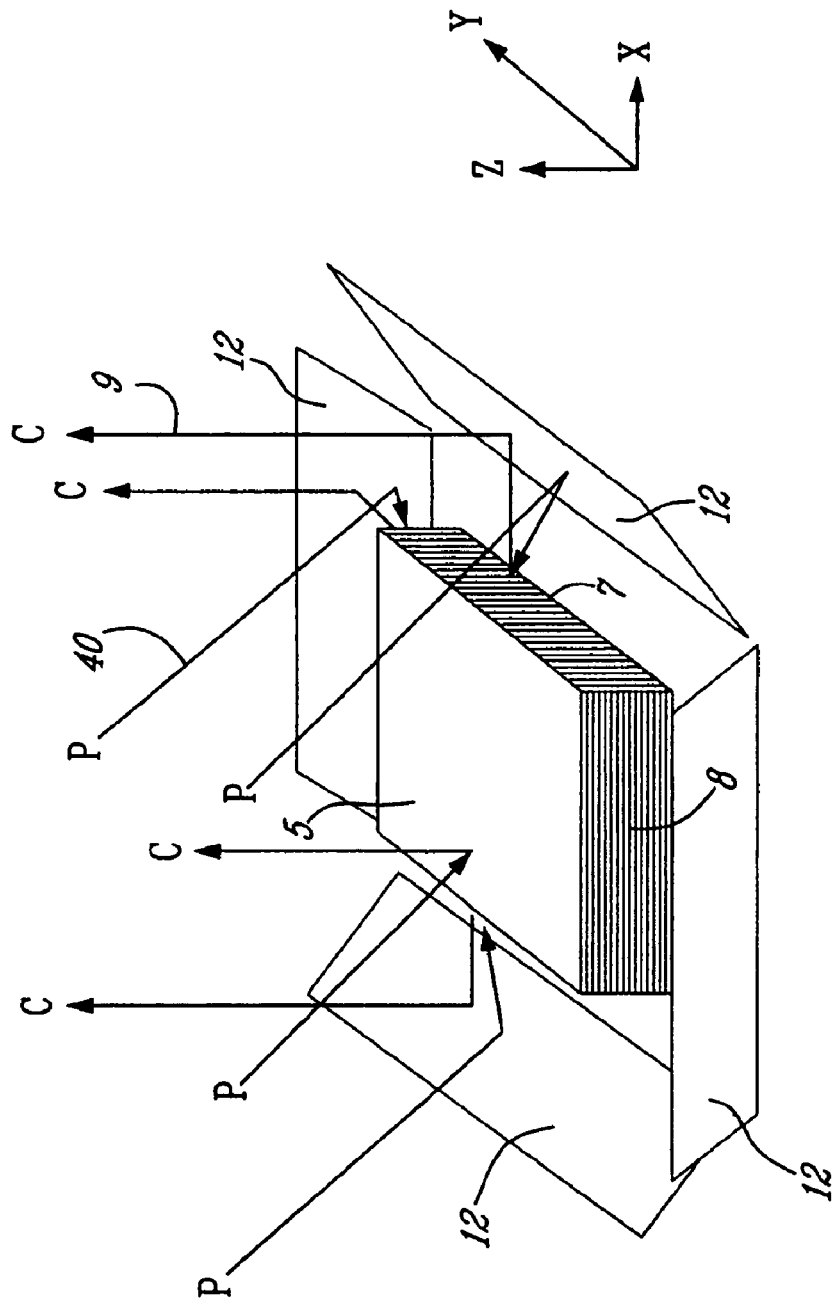
FIG. 5 is a perspective schematic view of part of the system of FIG. 2, when four side faces of the object are inspected using mirrors.

FIG. 5 is another example of the present invention: it illustrates a perspective schematic view of part of the system of FIG. 2, when four side faces 7,8 plus the top face 5 of the object 3 are inspected using mirrors 12. Mirrors 12 play the same role as prisms 11 in that they also change the direction of the scattered/projected rays corresponding to the side faces of the object. But, they do not, as a refractive material would, change the converging/diverging rate of converging/diverging rays. Therefore they do not displace a focal point as the prisms 11 could do. However, depending height of the object sides and on the depth of focus of the projection/detection assemblies, this arrangement may provide a satisfactory image of the object of all the object faces simultaneously. Naturally, when mirrors are combined with prisms or other optical devices such as a simple glass plate, all the faces of the object may be brought into focus easily.

Also, the image of the object may be obtained in two (or more) steps instead of simultaneously. For example, the portion of the intensity coming from the top face 5 of the object 3 is first detected with the detection assembly 50. The, the relative distance between the top face and the detection assembly is changed to bring into focus the portion of intensities coming form the side faces 7,8 of the object 3, and these portions of intensities are detected. Thus in two steps the image 13 that will serve to determined the relief map is obtained.

Figure 6:
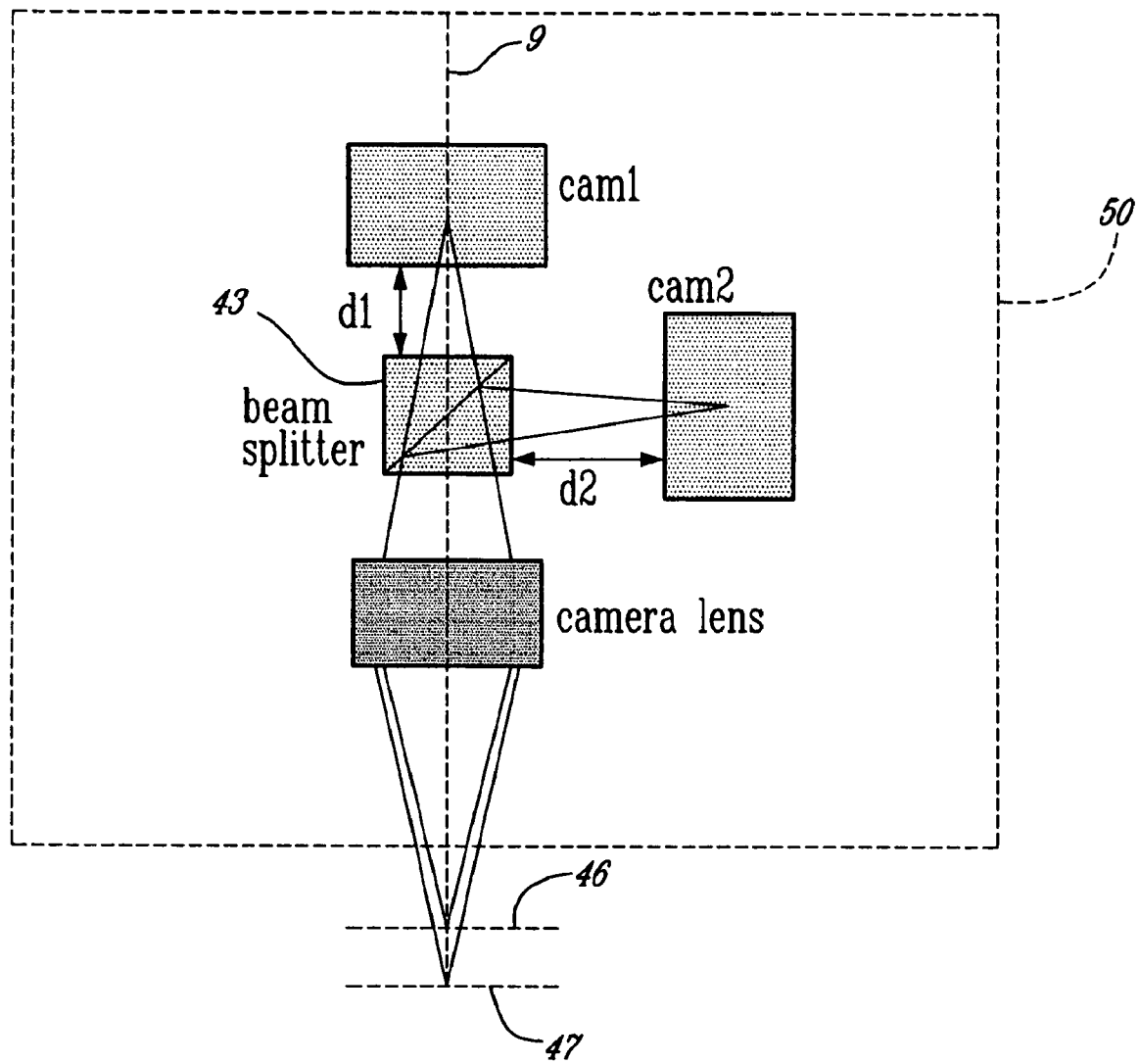
FIG. 6 is a schematic view of an alternative detection assembly configuration, in accordance with another embodiment of this invention.

If the detection assembly 50 can be provided with more than one camera, it may also be possible to image simultaneously all the sides of the object. FIG. 6 illustrates one possible configuration of the detection assembly 50 used for simultaneously measuring the top face and the side faces of an object by detecting the portion of intensity coming 46 from the top face with one camera (CAM1) and the portions of intensities 47 coming from the side faces with a second camera (CAM2). A beam splitter 43 is used to split the incoming light between the cameras.

Figure 10A:
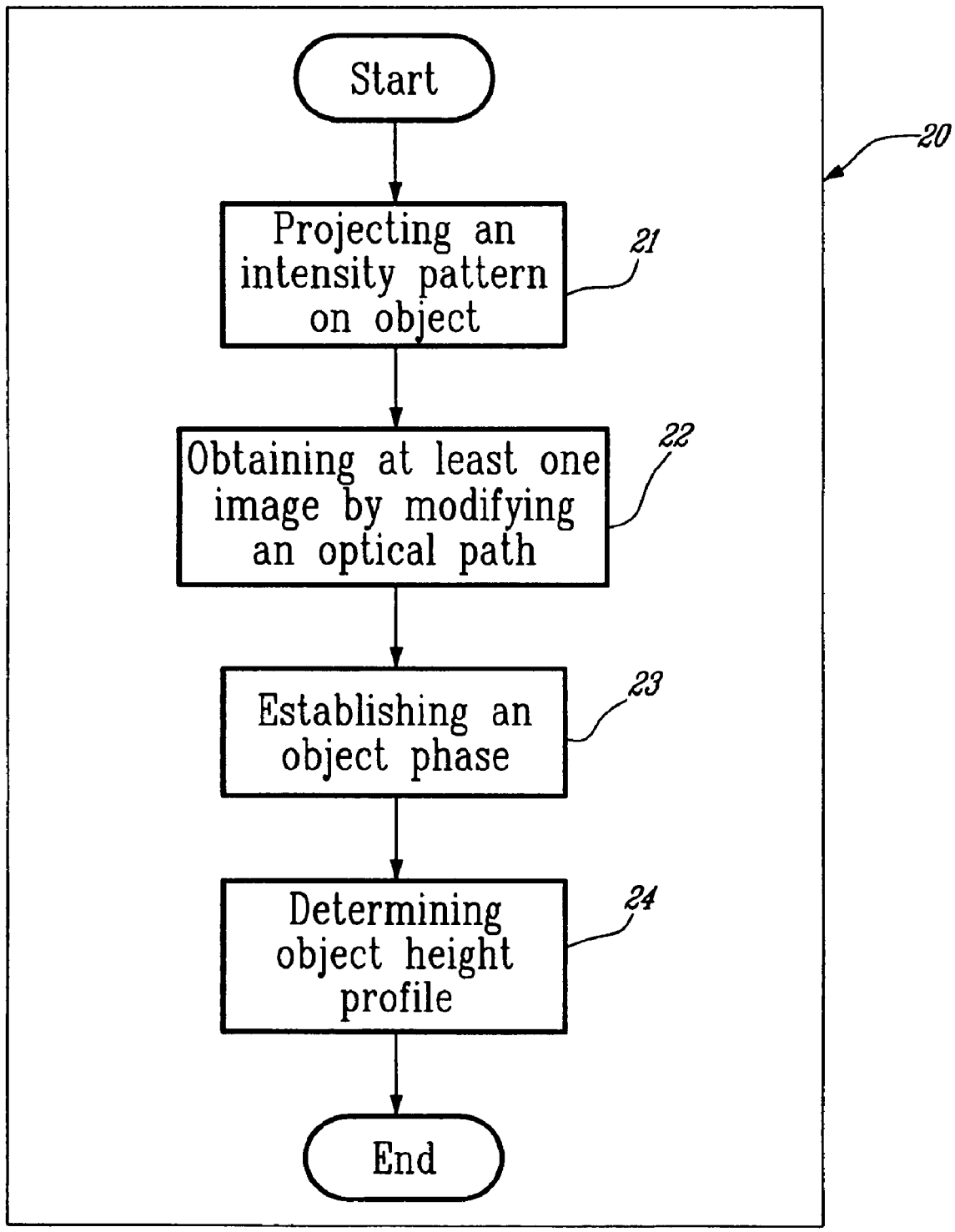
FIG. 10A is a flow chart of an FMI method to determine a relief map of several regions of a surface of an object in accordance with one embodiment of the present invention.

According to an embodiment of the present invention, a method 20 of determining a relief map of several regions of the surface area of an object, as illustrated in FIG. 10A, will be described. At least one intensity pattern is projected on the object (step 21) and at least one image is acquired after an optical path was modified (step 22). Then an object phase map, $\phi_{object}(x,y)$, is determined at step 23 using the image(s) acquired at step 22. By comparing the object phase map $\phi_{object}(x,y)$ to a reference phase map $\phi_{ref}(x,y)$ corresponding to a reference surface, the height profile or relief map of the selected regions of the object is determined at step 24.

Figure 10B:
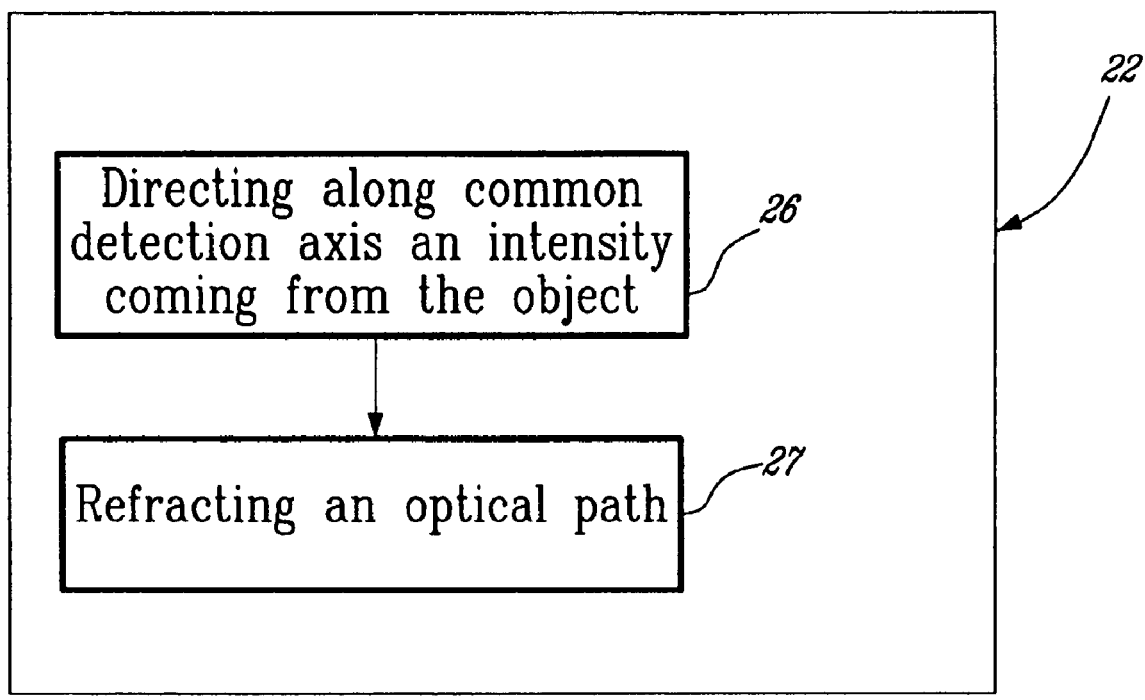
FIG. 10B is a flowchart describing in more detail the step of obtaining an image of the method of FIG. 10A.

FIG. 10B describes in more detail step 22, which involve modifying an optical path of at least one portion of intensity coming from one region of the object. At step 26, the optical path of the portion of intensity is directed along a common detection axis. Step 26 comprises changing the original direction of the scattered/incident rays by reflection, using for example a mirror 12 or a prism 11 (internal reflection). At step 27, the optical path of the portion of intensity is further modified by refracting the scattered/incident rays using, for example, a prism or a glass plate.

Figure 7:
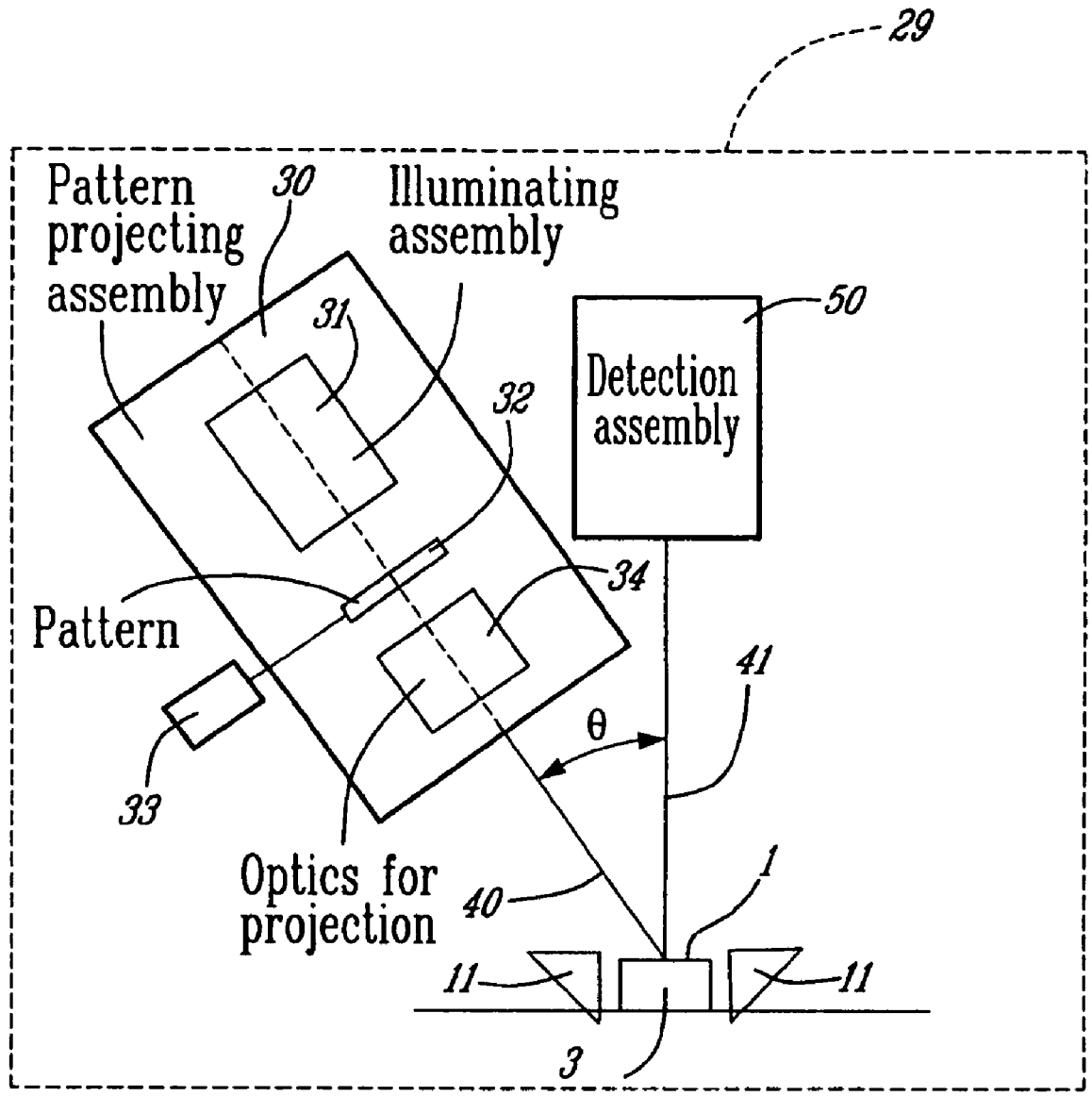
FIG. 7 is a schematic view of the system of FIG. 2, showing in more details the projection assembly.
Figure 8:
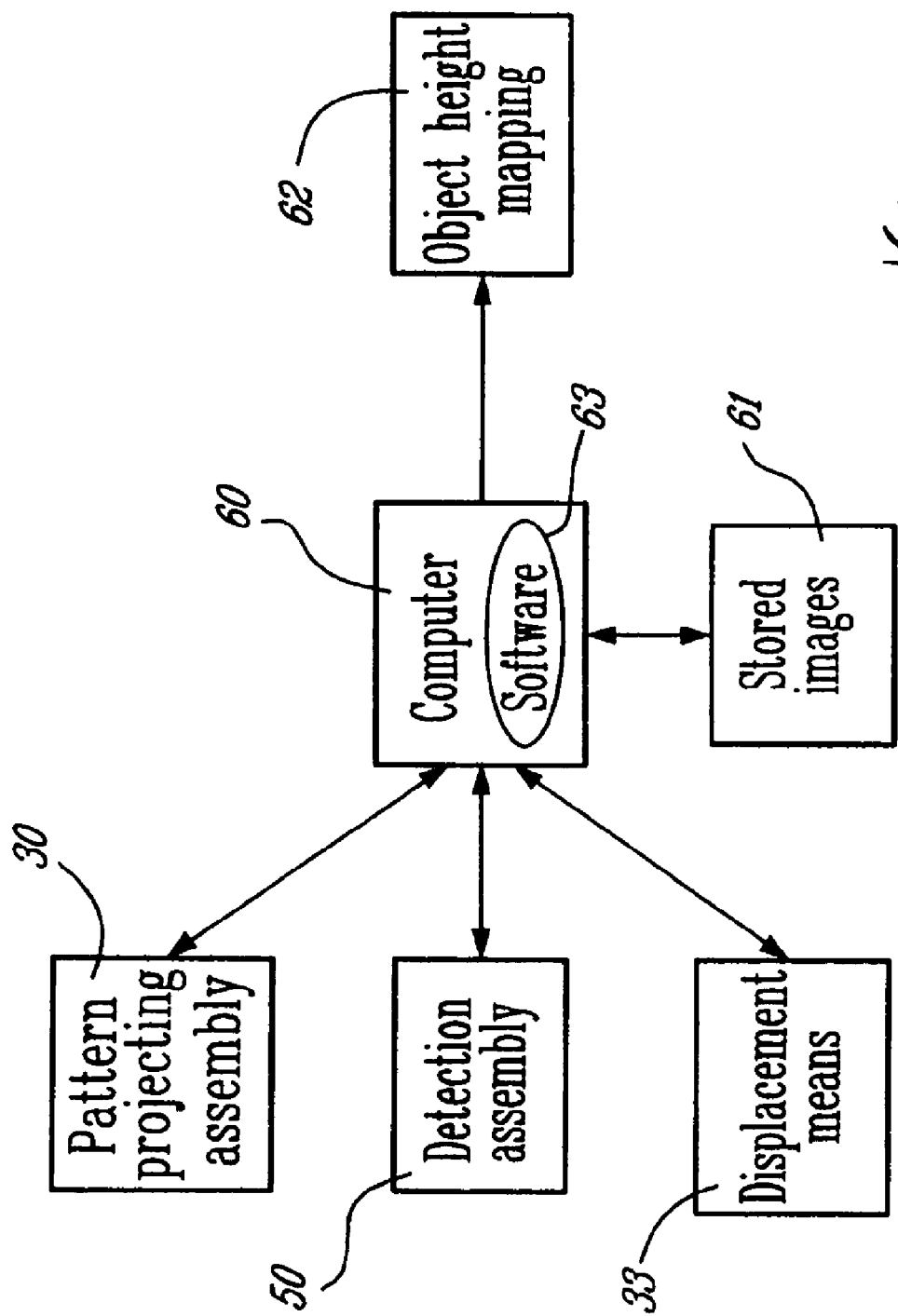
FIG. 8 is a block diagram describing the relations between the system components and a controller according to an embodiment of the present invention.

Turning now to FIGS. 7 and 8, a system 29 for determining a height profile of regions of a surface area of an object, according to an embodiment of the present invention, is shown. In FIG. 7, a pattern projection assembly 30 is used to project onto the surface 1 of the object 3, an intensity pattern. A detection assembly 50 is used to acquire images of the object. The detection assembly 50 can comprise a CCD camera or any other detection device. As previously discussed (FIG. 6), detection assembly 50 can comprise more than one camera, each camera being tuned to bring into focus each regions of the object. The detection assembly 50 can also comprise the necessary optical components known to those skilled in the art to relay appropriately the projected intensity pattern on the object to the detection device. Proper optical devices such as mirrors or prisms, are located near the side faces of the object (that are not directly in line of sight of the detection assembly), to direct along the detection axis scattered rays from the object. The pattern projection assembly 30 is projecting the intensity pattern along a projection axis 40 that makes an angle θ with respect to the normal of the surface of the object. In this particular embodiment, the detection axis 41 of the detection assembly coincides with the normal of the surface of the object. The pattern projection assembly 30 can comprise, for example, an illuminating assembly 31, a pattern 32, and optics for projection 34. The pattern 32 is illuminated by the illuminating assembly 31 and projected onto the object 3 by means of the optics for projection 34. The pattern can be a grid having a selected pitch value, p. Persons skilled in the art will appreciate that other kinds of patterns may also be used. The characteristics of the intensity pattern can be adjusted by tuning both the illuminating assembly 31 and the optics for projection 34. The pattern displacement means 33 is used to shift, in a controlled manner, the pattern 32 relatively to the object. The displacement can be provided by a mechanical device or could also be performed optically by translating the pattern intensity. This displacement can be controlled by a computer 60. Variants include displacement of the object 3 and displacement of the pattern projection assembly 30.

As illustrated in FIG. 8, the computer 60 can also control the alignment and magnification power of the pattern projection assembly and the alignment of the detection assembly 50. Naturally the computer 60 is used to compute the object height profile or object height mapping and to store the related date in data store 62 from the data acquired by the detection assembly 50. The computer 60 is also used to store acquired images and corresponding phase values in data store 61, and manage them. A software 63 can act as an interface between the computer and the user to add flexibility in the system operation.

The software 63 comprises the necessary algorithms to extract from the acquired images the object phase. If this information is extracted by using a FFT processing of the images, then software 63 will include a processing module comprising an FFT algorithm to perform an FFT on an image and provide a spectrum, a selection algorithm to select automatically a portion of the spectrum, an inverse FFT algorithm to perform an inverse FFT on the selected portion of the spectrum, and an algorithm to extract, from the imaginary and real components resulting from the inverse FFT, the phase map.

Figure 9A:
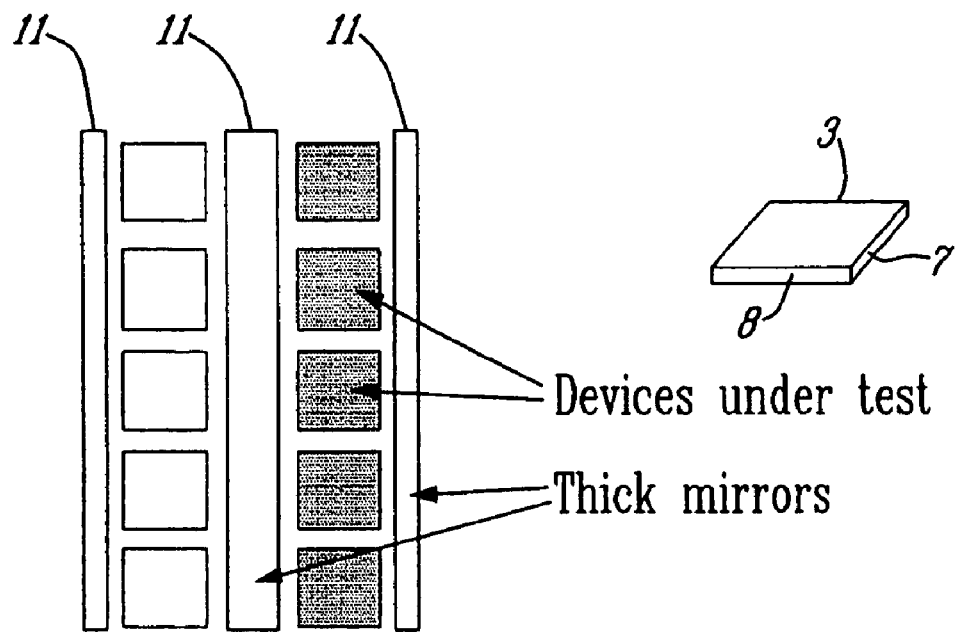
FIG. 9A is a schematic view of a multiple object inspection system, in accordance with one embodiment of the invention.

Turning now to FIG. 9A, a schematic view of a system for inspecting multiple objects is shown. Several objects 3 (devices under test) are aligned between thick mirrors 11, for inspecting their top face 5 and side faces 7,8 simultaneously. The method 20 of determining a height profile of an object that was just described can be also applied to several objects having multiple faces. FIG. 9A is an example of this embodiment where the thick mirrors (a kind of an elongated prism 11) are used to modify the optical path of the portions of intensity that are coming from the side faces (or that are incident on the side faces) of the aligned object.

Figure 9B:
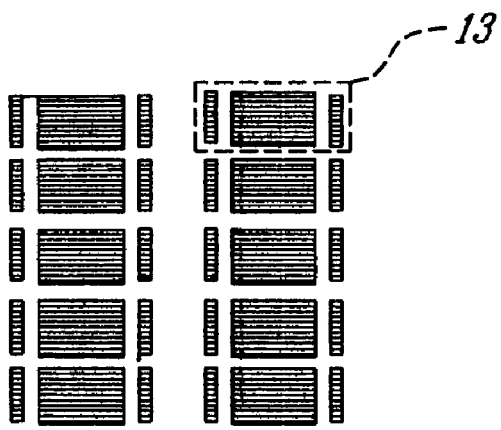
FIG. 9B is a schematic view of several images obtained with the system of FIG. 9A.

An alternative embodiment of the present invention is to determine simultaneously the height profile of regions of the surface area associated to one object and of regions of the surface area associated to another object. For example, the thick mirror appearing in the middle of the two series of aligned objects in FIG. 9A, can be designed, as someone skilled in the art will know, to modify in the same time the optical path of rays incident/scattered from the side faces of both series of objects. FIG. 9B gives an example of the type of images 13 one can obtained with the embodiment of FIG. 9A.

Although the present invention has been described hereinabove by way of specific embodiments thereof, it can be modified, without departing from the spirit and nature of the subject invention as defined herein.

Although the above description relates to a specific preferred embodiment as presently contemplated by the inventor, it will be understood that the invention in its broad aspect includes mechanical and functional equivalents of the elements described herein.

We claim:

1. An interferometric method for determining a height profile of regions of a surface area of an object, wherein said regions are substantially in different planes, the method comprising:
   projecting, along a projection axis, an intensity pattern onto said object and deflecting, towards at least one of said regions, a corresponding portion of said intensity pattern;
   obtaining an image of said regions along a detection axis different from said projection axis, by modifying an optical path of at least one portion of intensity coming from at least one of said regions, wherein said image comprises said at least one portion of intensity and corresponds to said intensity pattern projected on said regions;
   establishing an object phase associated with the regions using said image; and
   determining and storing said height profile of said regions using said object phase and a reference phase.

2. The method as claimed in claim 1, further comprising:
   obtaining a second image of said regions, by modifying an optical path of at least one portion of intensity coming from one of said regions to provide a second received intensity, wherein said second image comprises said second received intensity and corresponds to a second intensity pattern projected on said regions; and
   wherein said object phase is established further using said second image.

3. The method as claimed in claim 2, wherein said intensity patterns comprise intensity patterns that are phase-shifted with respect to each other.

4. The method as claimed in claim 2, wherein said intensity patterns comprise intensity patterns that have different spectral bandwidths.

5. The method as claimed in claim 1, wherein said height profile comprises a relief map of said regions of the surface area of the object and the object phase comprises an object phase map, to determine said relief map.

6. The method as claimed in claim 5, wherein said object comprises an object having a top face, a bottom face and a side face, wherein said side face is in an angled plane with respect to said top and bottom faces planes, and wherein said faces form the surface area of the object.

7. The method as claimed in claim 6, wherein said object comprises a substantially parallelepiped rectangle object having a top face, a bottom face and four side faces.

8. The method as claimed in claim 6, wherein said intensity pattern comprises a sinusoidal pattern.

9. The method as claimed in claim 6, wherein said intensity pattern comprises visible light intensity.

10. The method as claimed in claim 6, wherein modifying an optical path comprises directing along a common detection axis portions of intensity coming from the corresponding regions.

11. The method as claimed in claim 10, wherein said directing is provided by deflecting by substantially 90 degrees said at least one portion of intensity using reflection.

12. The method as claimed in claim 11, comprising using at least one of a mirror and a prism for providing said deflecting.

13. The method as claimed in claim 11, wherein obtaining an image further comprises projecting, along a projection axis, said intensity pattern and deflecting, towards each of said regions, a corresponding portion of said intensity pattern.

14. The method as claimed in claim 12, wherein obtaining an image further comprises projecting, along a projection axis, said intensity pattern and deflecting, towards each of said regions, a corresponding portion of said intensity pattern using said at least one of a mirror and a prism.

15. The method as claimed in claim 13, wherein obtaining an image comprises obtaining simultaneously said portions of intensity coming from the corresponding regions, to thereby simultaneously obtain said image and to provide for a simultaneous height profiling of said regions.

16. The method as claimed in claim 15, wherein obtaining said image simultaneously comprises displacing, by refraction, a focal point corresponding to a portion of intensity coming from one of said regions.

17. The method as claimed in claim 16, comprising using an optical device characterized by a refractive index to refract said optical path.

18. The method as claimed in claim 17, wherein obtaining said image simultaneously using an optical device characterized by a refractive index comprises using at least one of a prism and an optical plate.

19. The method as claimed in claim 18, wherein establishing an object phase associated with the regions comprises:

performing a Fast Fourier Transform (FFT) of said image for providing a spectrum;

performing an inverse FFT of a selected portion of said spectrum for providing imaginary and real components; and obtaining the object phase using said imaginary and real components.

20. The method as claimed in claim 18, further comprising evaluating a shape of a feature of said relief.

21. The method as claimed in claim 18, further comprising evaluating a volume of a feature of said relief.

22. The method as claimed in claim 18, further comprising: obtaining a second image of said regions, by modifying an optical path of at least one portion of intensity coming from one of said regions to provide a second received intensity, wherein said second image comprises said second received intensity and corresponds to a second intensity pattern projected on said regions; and wherein said object phase is established further using said second image.

23. The method as claimed in claim 22, wherein said intensity patterns comprise intensity patterns that are phase-shifted with respect to each other.

24. The method as claimed in claim 22, wherein said intensity patterns comprise intensity patterns that have different spectral bandwidths.

25. The method as claimed in claim 15, wherein obtaining said image simultaneously comprises separately obtaining each of said at least one portion of intensity composing said image.

26. The method as claimed in claim 25, wherein establishing an object phase associated with the regions comprises:
performing a Fast Fourier Transform (FFT) of said image for providing a spectrum;
performing an inverse FFT of a selected portion of said spectrum for providing imaginary and real components; and
obtaining the object phase using said imaginary and real components.

27. The method as claimed in claim 25, further comprising evaluating a shape of a feature of said relief.

28. The method as claimed in claim 25, further comprising evaluating a volume of a feature of said relief.

29. The method as claimed in claim 25, further comprising:
obtaining a second image of said regions, by modifying an optical path of at least one portion of intensity coming from one of said regions to provide a second received intensity, wherein said second image comprises said second received intensity and corresponds to a second intensity pattern projected on said regions; and
wherein said object phase is established further using said second image.

30. The method as claimed in claim 29, wherein said intensity patterns comprise intensity patterns that are phase-shifted with respect to each other.

31. The method as claimed in claim 29, wherein said intensity patterns comprise intensity patterns that have different spectral bandwidths.

32. The method as claimed in claim 15, wherein said detection axis is directed towards the top face of the object, and wherein obtaining said image simultaneously comprises obtaining an image of the side faces of the object, to thereby provide for a simultaneous profiling of the side faces of the object.

33. The method as claimed in claim 13, wherein obtaining an image comprises obtaining separately a first and a second portion of the image, wherein the first portion corresponds to the top side and wherein the second portion corresponds to the side faces of the object, to thereby provide for a profiling in two steps of said regions of said surface area of the object.

34. The method as claimed in claim 33, wherein establishing an object phase associated with the regions comprises:
performing a Fast Fourier Transform (FFT) of said image for providing a spectrum;
performing an inverse FFT of a selected portion of said spectrum for providing imaginary and real components; and
obtaining the object phase using said imaginary and real components.

35. The method as claimed in claim 33, further comprising evaluating a shape of a feature of said relief.

36. The method as claimed in claim 33, further comprising evaluating a volume of a feature of said relief.

37. The method as claimed in claim 33, further comprising:
obtaining a second image of said regions, by modifying an optical path of at least one portion of intensity coming from one of said regions to provide a second received intensity, wherein said second image comprises said second received intensity and corresponds to a second intensity pattern projected on said regions; and
wherein said object phase is established further using said second image.

38. The method as claimed in claim 37, wherein said intensity patterns comprise intensity patterns that are phase-shifted with respect to each other.

39. The method as claimed in claim 37, wherein said intensity patterns comprise intensity patterns that have different spectral bandwidths.

40. The method as claimed in claim 13, wherein obtaining an image comprises obtaining separately a first and a second portion of the image, wherein the first portion corresponds to the top face and two side faces and wherein the other portion corresponds to the other side faces of the object, to thereby provide for a profiling in two steps of said regions of said surface area of the object.

41. An interferometric method for determining a height profile of a region of a surface area of an object, wherein said region is not substantially in the line of sight of a detection axis, the method comprising:
projecting, along a projection axis, an intensity pattern onto said object and deflecting, towards at least one of said regions, a corresponding portion of said intensity pattern;
obtaining, along said detection axis different from said projection axis, an image of said region, by modifying an optical path of an intensity coming from said region to provide a redirected intensity, wherein said redirected intensity forms said image and corresponds to an intensity pattern projected on said region;
establishing an object phase associated with the region using said image; and
determining and storing said height profile of said region using said object phase and a reference phase.

42. An interferometric method for determining a height profile of regions of a surface area of a first object and of regions of surface area of a second object, wherein said regions are substantially in different planes, the method comprising:
projecting, along a projection axis, an intensity pattern onto said object and deflecting, towards at least one of said regions, a corresponding portion of said intensity pattern;
obtaining an image of said regions along a detection axis different from said projection axis, by modifying an optical path of at least one portion of intensity coming from one of said regions, wherein said image comprises said portion of intensity and corresponds to an intensity pattern projected on said regions;

establishing a first and second object phase associated with the regions using said image; and determining and storing said height profile of said regions of the first and second object using said object phases and a reference phase.

43. An interferometric system for determining a height profile of regions of a surface area of an object, wherein said regions are substantially in different planes, the system comprising: a pattern projection assembly for projecting an intensity pattern along a projection axis towards the object; an optical assembly for directing along a detection axis different from said projection axis an intensity coming from said regions of the object to provide a directed intensity; a detection assembly for obtaining along the detection axis at least one image of the object by detecting said directed intensity coming from said regions; and a processor for establishing a phase of the object using said at least one image and for determining the height of said object using said object phase and a reference phase.

44. The system as claimed in claim 43, wherein said pattern projection assembly comprises an illuminating assembly, a pattern, and optical elements for providing said intensity pattern.

45. The system as claimed in claim 44, wherein said detection assembly comprises a detection device and optical devices for acquiring said image characterizing said object.

46. The system as claimed in claim 45, wherein said detection assembly comprises a CCD camera.

47. The system as claimed in claim 45, wherein said optical assembly comprises at least one of a mirror, a prism, and an optical plate.

48. The system as claimed in claim 47, wherein said optical assembly is positioned with respect to the region in order to redirect along a detection axis a portion of intensity coming from said region.

49. The system as claimed in claim 48, wherein said optical assembly is also positioned in the detection assembly with respect to the region in order to image said portion of intensity.

50. The system as claimed in claim 49, further comprising displacement means for positioning, at selected positions, said intensity pattern relative to said object.

51. The system as claimed in claim 50, wherein said processor further comprises a controller to control one of at least the projection assembly, the detection assembly and the displacement means.

52. The system as claimed in claim 51, wherein said controlling comprises controlling said displacement means such that a first image is obtained at a first projection of the intensity pattern and a second image is obtained at a second projection of the intensity pattern, said second projection being phase-shifted relative to the first projection.

53. The system as claimed in claim 49, wherein said processor comprises a Fast Fourier Transform software for establishing the object phase.

54. The system as claimed in claim 49, wherein: said pattern projection assembly comprises an assembly for simultaneously projecting at least two phase-shifted intensity patterns on the regions, each of the projected patterns being characterized by a predetermined bandwidth; and wherein said detection assembly comprises an image acquisition apparatus sensitive to said predetermined bandwidths for simultaneously taking an image of each of the projected patterns on the object.

55. A method of manufacturing a semiconductor product comprising an object, the method comprising inspection of the object, wherein the inspection comprises determining a height profile of regions of a surface area of the object according to the method as claimed in any one of claims 1 to 40.

* * * * *